United States Patent
Dong et al.

(10) Patent No.: US 10,622,712 B2
(45) Date of Patent: Apr. 14, 2020

(54) DEVICE WITH AN ANTENNA

(71) Applicant: PHILIPS LIGHTING HOLDING B.V., Eindhoven (NL)

(72) Inventors: Peiliang Dong, Shanghai (CN); You Li, Shanghai (CN); Lihua Lin, Shanghai (CN); Zhi Chen, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 45 days.

(21) Appl. No.: 15/745,304

(22) PCT Filed: Jun. 28, 2016

(86) PCT No.: PCT/EP2016/064925
§ 371 (c)(1),
(2) Date: Jan. 16, 2018

(87) PCT Pub. No.: WO2017/012834
PCT Pub. Date: Jan. 26, 2017

(65) Prior Publication Data
US 2019/0013572 A1  Jan. 10, 2019

(30) Foreign Application Priority Data

Jul. 17, 2015  (WO) ................ PCT/CN2015/084340
Oct. 29, 2015  (EP) ..................................... 15192093

(51) Int. Cl.
*H01Q 1/52* (2006.01)
*H01Q 1/22* (2006.01)
(Continued)

(52) U.S. Cl.
CPC .............. *H01Q 1/52* (2013.01); *F21V 23/02* (2013.01); *H01Q 1/2216* (2013.01);
(Continued)

(58) Field of Classification Search
CPC ...... H01Q 1/22; H01Q 1/2208; H01Q 1/2216; H01Q 1/2225; H01Q 1/44; H01Q 1/52;
(Continued)

(56) References Cited

U.S. PATENT DOCUMENTS

2003/0146803 A1   8/2003   Pickard et al.
2007/0273600 A1   11/2007  Tsujimura et al.
(Continued)

FOREIGN PATENT DOCUMENTS

CN   204335098 U   5/2015

OTHER PUBLICATIONS

Fatima Zahra Hanin et al., "Influence of the Integration of Ferrite Films in the Substrate, on Resonant Frequency of the Patch Antenna," ISSN: 2248-9622, vol. 3, Issue 6, Nov.-Dec. 2013 (4 Pages).
(Continued)

*Primary Examiner* — Robert Karacsony
(74) *Attorney, Agent, or Firm* — Stephen M. Kohen

(57) ABSTRACT

The invention provides an electrical device, comprising a transformer (22) with a ferrite core (24) and an RF antenna (14). The antenna (14) is electrically isolated from said transformer (22), and a geometric dimension of the antenna (14) has a maximum dimension along or around a surface of the RF antenna (i.e. within the plane of the antenna or around a curved surface defining the antenna), and the RF antenna (14) is spatially spaced from a nearest part of the ferrite core (24) by less than the maximum dimension. This design makes use of the ferrite core of a transformer to provide isolation of the antenna from other parts of the device. This assists in reducing the impact of those parts of the device on the performance of the antenna, in particular the reception range.

20 Claims, 3 Drawing Sheets

(51) Int. Cl.
  *H01Q 1/44* (2006.01)
  *H01Q 1/38* (2006.01)
  *F21V 23/02* (2006.01)
  *H04B 5/00* (2006.01)
  *F21Y 115/10* (2016.01)

(52) U.S. Cl.
  CPC .............. *H01Q 1/2225* (2013.01); *H01Q 1/38* (2013.01); *H01Q 1/44* (2013.01); *H01Q 1/526* (2013.01); *H04B 5/00* (2013.01); *F21Y 2115/10* (2016.08)

(58) Field of Classification Search
  CPC .......... H01Q 1/526; H01Q 1/528; H01Q 1/38; F21V 23/02; H05B 37/0272
  See application file for complete search history.

(56) References Cited

U.S. PATENT DOCUMENTS

| | | | |
|---|---|---|---|
| 2008/0316134 A1 | 12/2008 | Sato | |
| 2012/0276963 A1* | 11/2012 | Narendra | .................. H01Q 1/48 455/575.7 |
| 2014/0355246 A1 | 12/2014 | Yotsumoto et al. | |

OTHER PUBLICATIONS scientific.net, "The Influence of Ferrite Materials to NFC Antenna," http://www.scientific.net/amr.1006-1007.994, Apr. 28, 2015 (3 Pages).
Electrical Engineering Stack Exchange, "Energy—Why Is an Inductor Not a Good Antenna?" http://electronics.stackexchange.com/questions/58027/why-is-an-induct . . . , Apr. 28, 2015 (4 Pages).

\* cited by examiner

DEVICE WITH AN ANTENNA

CROSS-REFERENCE TO PRIOR APPLICATIONS

This application is the U.S. National Phase application under 35 U.S.C. § 371 of International Application No. PCT/EP2016/064925, filed on Jun. 28, 2016, which claims the benefit of International Application No. PCT/CN2015/084340, filed on Jul. 17, 2015 and European Patent Application No. 15192093.1, filed on Oct. 29, 2015. These applications are hereby incorporated by reference herein.

FIELD OF THE INVENTION

This invention relates to electrical devices which incorporates an antenna, and in particular it relates to devices which also make use of a transformer.

BACKGROUND OF THE INVENTION

Many different types of device are fitted with a radio frequency (RF) antenna, to enable wireless remote communication with the device, for example for configuration of the device or for remote control of the device. For example, near field communication (NFC) enables communication wirelessly and in a non-contact way with a device using a remote communications device.

One example of a type of device which is increasingly being provided with a wireless communications interface is a luminaire or other lighting arrangement. The wireless communication may be used to control the light output.

A near field communication (NFC) system embedded into an LED luminaire or module for example enables easy configuration and reconfiguration of the light output. This is for example implemented by adding an NFC tag integrated circuit (IC) and its associated antenna to the lighting product. The IC has wired internal connections to the embedded master control unit of the product, so that instructions written to the tag IC by a remote NFC transponder may be accessed by the master control unit.

US20030146803A1 discloses a matching network that couples the RF power supply to the RF antenna. The RF power supply is connected to the primary side of a transformer and the antenna is connected electrically at the secondary side of the transformer.

Often, a metal housing and/or heat sink is a part of electrical module. The NFC tag is then integrated with a printed circuit board (PCB) inside the module. The antenna performance, for example as indicated by the maximum reading distance of the antenna of a particular NFC reader, is seriously affected due to these surrounding metal parts.

One usual approach to maintain a large reading distance is to provide ferrite material, such as a ferrite sheet, to isolate the antenna from the surrounding metal parts. However, using an extra ferrite sheet leads to increased material cost. US20070273600A1 discloses a structure that a magnetic member is interposed and arranged between an antenna element and a printed circuit board, and the magnetic member is for demonstrating a high isolation effect between the antenna element and the ground plane of the printed circuit board, thereby enhancing antenna radiation characteristics. US20070273600A1 further discloses a magnetic layer that can be used as an excellent member of a high-frequency magnetic component used in 100 MHz or in a high-frequency domain of 1 GHz or above such as an antenna substrate, a transformer magnetic core, a magnetic head core, an inductor, a choke coil, a filter "or" a wave absorber.

SUMMARY OF THE INVENTION

It would be desirable to enable antenna performance within a device to be maintained but without requiring additional shielding components.

The invention is defined by the claims.

According to examples in accordance with an aspect of the invention, there is provided an electrical device, comprising:

a transformer with a ferrite core; and
an RF antenna,
wherein said RF antenna is electrically isolated from said transformer and a geometric dimension of the RF antenna along a surface of the antenna has a maximum dimension, and the antenna is spatially spaced from a nearest part of the ferrite core by less than the maximum dimension.

The invention makes use of the ferrite core of a transformer to provide isolation of the antenna from other parts of the device. This assists in reducing the impact of those parts of the device on the performance of the antenna, in particular the reception range. It may avoid the need for a ferromagnetic shielding plate. In this way, a double function of the transformer is realized: both electrically transforming for the existing circuit within the device and also providing its ferrite core for isolation from the metal parts for the RF antenna. A big difference from US20070273600A1 is that this prior art only discloses the magnetic layer can be used as antenna substrate OR a transformer magnetic core, and this prior art does not discloses the above double function of the ferrite core.

In a more specific embodiment, the antenna may comprise a rectangular antenna and the maximum dimension comprises the length of the diagonal, or the antenna may comprise a circular or oval antenna and the maximum dimension comprises the maximum diameter.

The invention may be applied to various antenna designs. In general, for any shape of antenna, the maximum dimension may be taken to be the largest point-to-point dimension between points of the antenna within or around the surface on which the antenna is formed. The spacing may be less than 90% or less than 80% or less than 70% or even less than 60% of this maximum dimension. The antenna is typically a track antenna.

The RF antenna preferably comprises a near field communications antenna with a maximum range of less than ten times the maximum dimension. It for example comprises a planar antenna, in other words, the antenna as a whole extends mainly on a plane. Alternatively, the antenna could also be a curved antenna wherein the antenna as a whole extends on a curved surface.

Such short range antennas are particularly vulnerable to any reduction in range caused by a reduction in electromagnetic flux density. The invention enables the antenna performance to be maintained. It also improves isolation from interference.

The RF antenna is for example part of an NFC transponder tag or an NFC reader/writer.

The ferrite core may comprise a cuboid with one of the larger faces facing the RF antenna, wherein the area of the larger face of the ferrite core is larger than the area of the RF antenna.

This provides the best isolation. However, RF performance is improved even with a smaller one of the faces of the ferrite core facing the antenna.

The device may comprise a metal body such as a heat sink, wherein the RF antenna is mounted close to the metal body.

The metal body is particularly likely to have a negative impact on the antenna performance. In an LED driver module the tag is inevitably close to a heat sink, so that the use of the ferrite transformer core reduces the impact of the heat sink.

The device may comprise a housing which is used as the heat sink, and the RF antenna is amounted inside the housing.

Typically, the antenna will be inside such a housing, so that it is untouchable by users. However, the housing will not be fully covered in metal, otherwise the antenna will not function. The housing may be plastic or partly metal and partly plastic. For example, some surfaces of an outer housing may be covered in metal to function as a heat sink. The non-covered surface or surfaces, which is where the NFC antenna is placed, is not metal-covered, but covered by plastic or other insulating parts, or it may be open to the air at that part of the housing.

Preferably, the ferrite core nearest the RF antenna is bare without any winding coil of the transformer. In this way, the ferrite core is not blocked by the winding coil and the shielding performance is thus optimized.

The device may comprise a driver circuit, wherein the transformer is part of the driver circuit. For example, the driver circuit may comprise an isolated switch mode power supply. More specifically, the switch mode power supply may be a flyback converter wherein the transformer acts as energy storage and freewheel element. Alternatively, the transformer may be used to change a voltage or current according to the winding ratio.

The invention also provides an LED light module comprising:

a device with a driver circuit as defined above; and
an LED light unit driven by the device.

The light module may further comprise a configuration circuit for configuring the LED light unit output in response to wireless commands received by the RF antenna. These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides an electrical device, comprising a transformer with a ferrite core and an RF antenna. The antenna has a maximum dimension along or around a surface of the antenna (i.e. within the plane of the antenna or around a curved surface defining the antenna), and the antenna is spaced from a nearest part of the ferrite core by less than the maximum dimension. This design makes use of the ferrite core of an existing transformer (i.e., a transformer which is already needed in the device for its own function) to provide isolation of the antenna from other parts of the device. This assists in reducing the impact of those parts of the device on the performance of the antenna, in particular the reception range.

Figure 1:
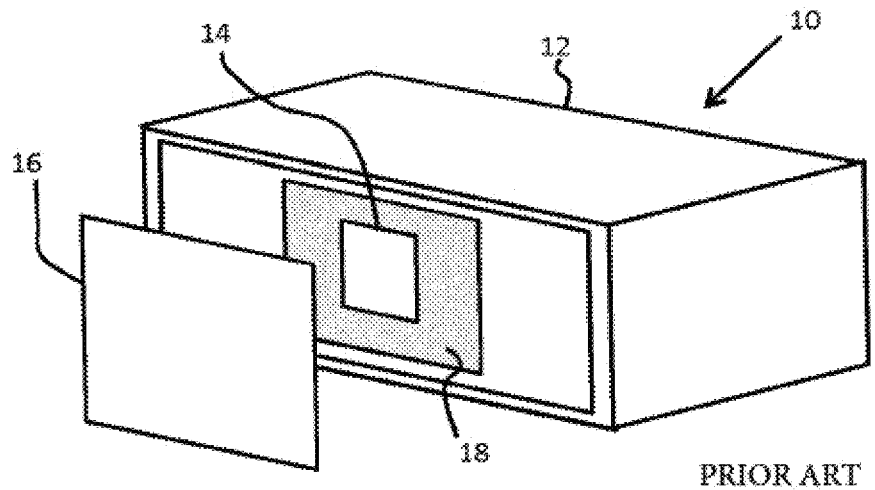
FIG. 1 shows a known approach for providing antenna shielding.

FIG. 1 shows a known approach for providing antenna shielding. It shows an electrical device 10 in which the electrical components are mounted within a metal housing 12. This housing functions as a heat sink. The device has an antenna 14 for communicating wirelessly with a remote wireless reading and writing transponder 16. The antenna 14 is near the outer surface of the device, for example behind a non-metal cover, or the housing may be open at the end where the antenna is mounted. Behind the antenna, there is provided a sheet 18 of ferrite material to shield the antenna and thereby isolate the antenna from the surrounding metal parts.

Figure 2:
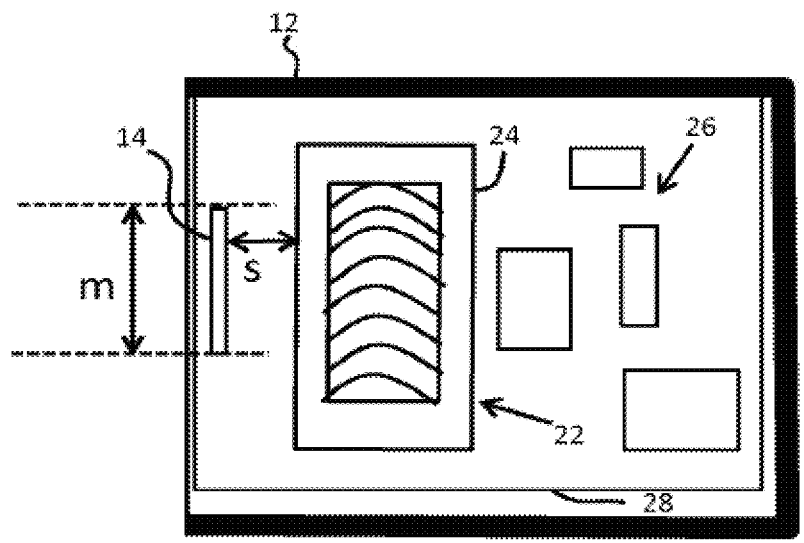
FIG. 2 shows an electrical device in accordance with an example of the invention.

FIG. 2 shows a device in accordance with an example of the invention. The device 20 comprises a transformer 22 with a ferrite core 24. In the example shown, the ferrite core 24 surrounds a coil arrangement and the outer surface of the ferrite core is bare without a coil arrangement. The coil arrangement is thus internally within an opening in the ferrite core, and an external face of the ferrite core facing the antenna is a planar surface, with the transformer coils behind the surface. The RF antenna 14 has a maximum dimension m along a surface of the antenna, and the antenna is spaced from a nearest part of the ferrite core by a spacing s less than the maximum dimension.

The device has an outer housing 12 which functions as a heat sink. Various other electrical and electronic components 26 are mounted in the housing 12, for example carried by a shared printed circuit board 28.

The electrical components 26 for example comprise circuit elements which, together with the transformer, form a switch mode power supply of a driver circuit. The components then for example include an LED arrangement driven by the driver circuit.

For the example of a configurable lighting device, the components also include a configuration circuit for configuring the light unit output in response to wireless commands received by the RF antenna.

FIG. 2 shows a plan view of the circuit board. The antenna 14 is mounted upright on the board. In the case of a planar antenna, it then has a plane which is perpendicular to the plane of the printed circuit board 28. The ferrite core 24 also has a dimension perpendicular to the printed circuit board, i.e. a height over the board. Preferably, the perpendicular height of the ferrite core is at least half the height of the antenna over the printed circuit board.

The bare outer surface of the ferrite core 24 for example has a side face which faces the antenna. This side face may extend in a plane perpendicular to the plane of the antenna (or perpendicular to a general plane of the antenna if the antenna is not flat). The area of this side face is preferably equal or greater than the area of the antenna. For example, the ferrite core may have a generally cuboid outer surface, and the side face is one of the outer faces of the cuboid. It may be the larger of the two types of outer face of the cuboid (i.e. excluding the top and bottom, parallel to the printed circuit board) but this is not essential.

The ferrite core also does not need to be a cuboid, nor does it need to present a planar surface towards the antenna.

The antenna does not have to be mounted perpendicularly to the main PCB. It may be mounted at an angle, or it may be printed on the PCB so that the reader is designed to be positioned over the main printed circuit board rather than at the edge as in the example of FIG. 2.

Furthermore, the antenna does not need to be planar, although this is likely to be the lowest cost solution. The antenna may be defined over a curved surface. For example, the antenna may be flexible and for attachment to a curved surface, such as the inner surface of a cylindrical housing. The antenna may be a film printed flexible structure which can be attached to a non-planar surface. An example of a cylindrical product is a cylinder shaped spot light.

In this case, the spacing s shown in FIG. 2 may be defined as the shortest distance between any point of the antenna and the transformer core.

The antenna may comprise a flat track arrangement, for example based on tracks of a printed circuit board, but it may instead comprise an arrangement of wires, such as glazed wires.

The antenna may be rectangular or square, and the maximum dimension of the antenna may be taken to be the length of the diagonal. The antenna may instead be circular or oval in which case the maximum dimension may be taken to be the longest diameter.

The invention is of particular interest for near field communications antennas, where any reduction in range may have a significant impact on the functionality of the communications system. For example a near field communications antenna may be understood to be one with maximum communication range of less than ten times the antenna maximum dimension, for example less than 5 times the antenna maximum dimension, and even around only two times the maximum antenna dimension.

The effect of the shielding has been modeled.

Figures 3, 4, 5:
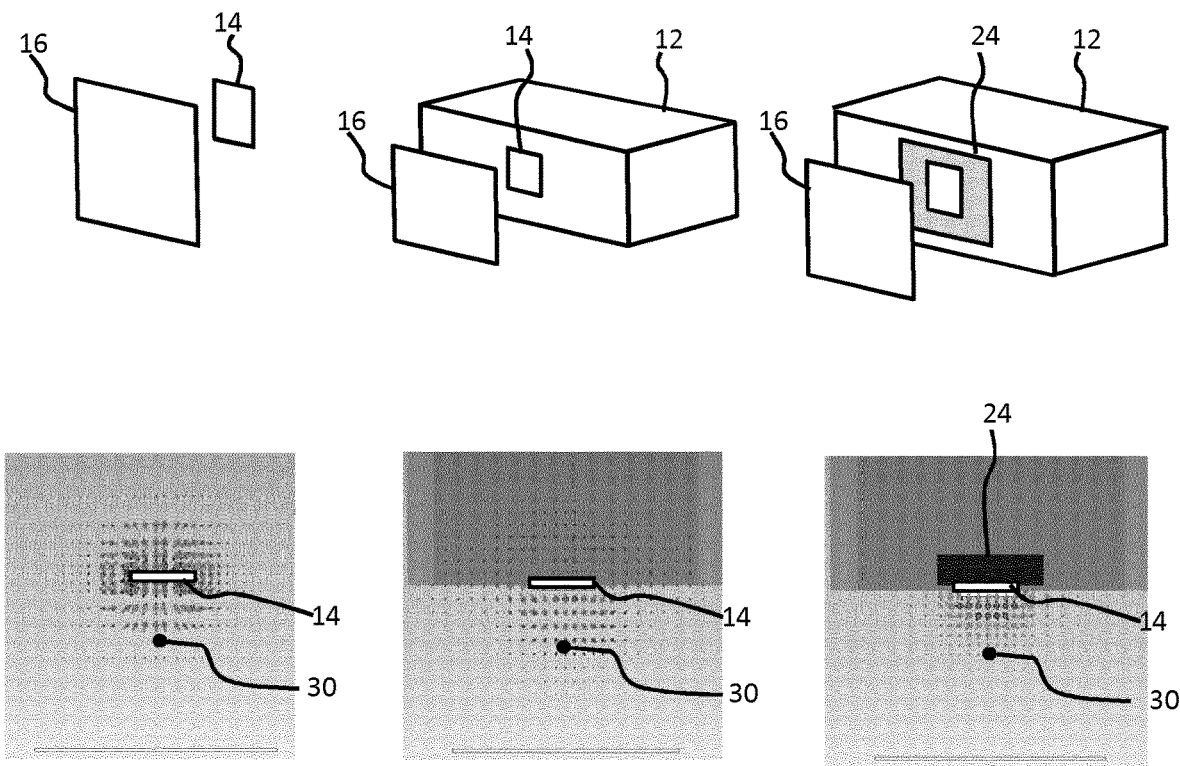
FIG. 3 shows a first product design as well as the resulting electromagnetic field distribution around an antenna.
FIG. 4 shows a second product design as well as the resulting electromagnetic field distribution around an antenna.
FIG. 5 shows a product design in accordance with the invention as well as the resulting electromagnetic field distribution around an antenna.

FIG. 3 shows the antenna 14 and reader 16 with no other interfering parts. The bottom part shows the electromagnetic field distribution around the antenna 14. For a particular antenna design and RF IC, the maximum reading distance is around 3 cm. The electromagnetic field strength at a given point 30, which is 1 cm from the antenna, is determined by the model used to be 7.27 A/m.

When the antenna is formed as part of a circuit which is associated with a heat sink housing 12 as shown in FIG. 4, the maximum reading distance drops to around 2 cm. The electromagnetic field strength at the given point 30 drops to 6.35 A/m.

FIG. 5 shows the effect of mounting a transformer core 24 behind the antenna. The maximum reading distance increases back to around 3 cm. The electromagnetic field strength at the given point 30 increases to 13.56 A/m.

In the examples of FIGS. 3 to 5, the NFC tag has dimensions 10 mm×10 mm. In FIG. 5, the ferrite core is a PC40 ferrite material and the transformer is an EF20 transformer, which is located at 1 mm behind the antenna.

The transformer size in plan view is 47 mm×34 mm with a ferrite core of 20×20×6 mm. Thus, in this example the ferrite core has a height of 6 mm over the printed circuit board and the antenna has a height of 10 mm. The antenna area is 100 mm² and the area of the side of the ferrite core facing the antenna is 120 mm².

The effect of the spacing s is explained with reference to FIG. 6, in which plot 61 shows the average electromagnetic field strength as a function of the spacing distance s, where the spacing distance is perpendicular to the plane of the antenna. The electromagnetic field strength is measured at a distance of 3 cm from the antenna using a test board 60 (of dimensions 43 mm×52 mm). Plot 62 shows the field strength when no ferrite is present, but the housing and other components are the same.

Figure 6:
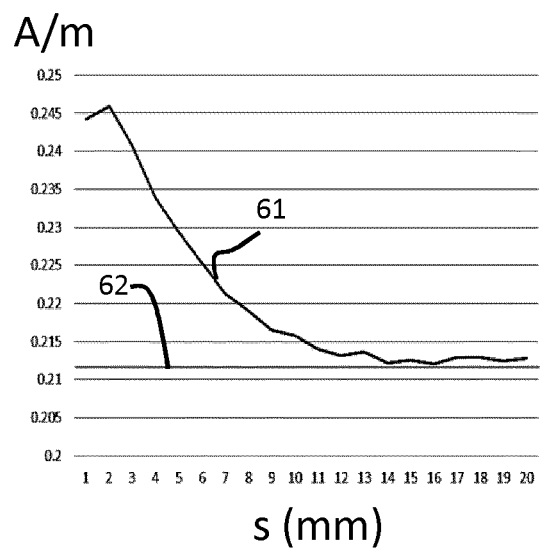
FIG. 6 shows the electromagnetic field strength as a function of perpendicular distance from the antenna.
Figure 6:
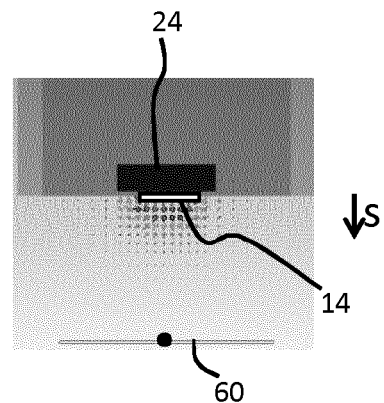

When the spacing between the ferrite transformer core and the antenna is increased from 1 mm to 20 mm, as plotted in FIG. 6, the average strength of the electromagnetic field starts with a value much higher than that of the ferrite-free case, then decreases gradually, and tends to be stable and slightly above that of the ferrite-free case. This shows that the transformer can enhance the NFC performance over a considerable range of positions, but particularly if the minimum spacing is less than the maximum dimension of the antenna, which in this example is the diagonal distance of 14 mm. It shows that as the spacing is reduced, the benefit obtained is increased, so that preferably the spacing is less than 90% of the maximum dimension, or more preferably less than 80%, or more preferably less than 70% or even less than 60% of the maximum antenna dimension.

Figure 7:
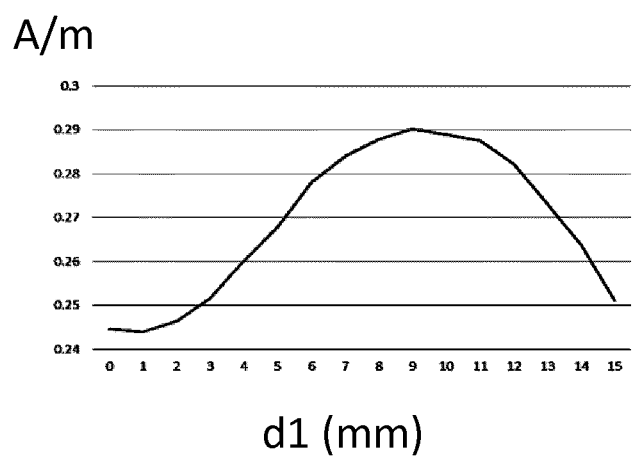
FIG. 7 shows the electromagnetic field strength as a function of lateral distance with respect to the antenna.
Figure 7:
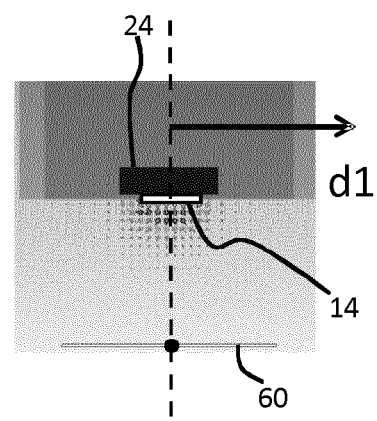

The lateral alignment between the antenna and the ferrite core will also influence the performance. FIG. 7 shows a plot of the average electromagnetic field strength as a function of the lateral offset dl from a centrally aligned position (as is shown in FIG. 7), with the spacing s maintained at 1 mm.

With the gap of 1 mm, the strength of the electromagnetic field first increases and then decreases when the horizontal distance between the antenna and the ferrite increases from 0 to 15 mm.

The performance as a function of the alignment position will be different for each different application. FIG. 7 shows that for the example simulated, the optimal positioning is (perhaps surprisingly) not with the center of the antenna 14 aligned with the center of the ferrite core. In FIG. 7, the ferrite core is larger in lateral width than the antenna. When dl increases from 0 to 9 mm, the overall shielding effect caused by the metal isolation obtained at one side increases more rapidly than the decrease at the other side, so that overall the magnetic field strength increases. Beyond 9 mm, the metal isolation effect becomes weaker.

Note that the y-axis in FIG. 7 extends only between values of 0.24 and 0.3. Thus, the performance is not critically sensitive to positioning. The transformer can be placed to the side of the antenna coil. As shown, an optimal alignment position may not be central; this will depend on the specific product design. Deviation from the point of optimal alignment can be tolerated with limited reduction in performance.

The transformer improves the reading distance because of the ferrite magnetic core of the transformer. The surrounding metal materials will produce eddy current effects. When the current in the transformer coil changes with time, electromagnetic induction causes induced currents in nearby metal components, thus affecting the spatial electromagnetic field distribution of the of the antenna. The ferrite material of core weakens the eddy current effects, and thereby improves reading distance.

By placing the transformer close to the antenna as explained above, the antenna may no longer need any additional ferrite sheet to isolate the surrounding metal parts.

The invention is of interest for any devices which include a transformer and an RF antenna. A transformer is widely used in circuits as part of a power supply or power conversion arrangement. For example, solid state lighting circuits, such as LED circuits, often include transformers as part of switch mode power supplies.

The invention is thus of interest for LED electronics, and LED modules & luminaires. When such modules and luminaires incorporate wireless control, but are desired with a small inner space, the invention enables a reduction in the number of components and therefore the space needed.

The invention may however be applied to other devices which include both a transformer and an RF antenna.

The invention is of particular interest for near field communications devices, but the same approach may be adopted with RF antennas generally.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. An electrical device comprising:
a transformer with a ferrite core; and
an RF antenna having a geometric dimension along a surface of the RF antenna,
wherein the RF antenna is electrically isolated from the transformer, and the RF antenna is spaced from a part of the ferrite core nearest to the RF antenna by less than a length of the geometric dimension of the RF antenna.

2. The electrical device as claimed in claim 1, wherein the geometric dimension of the RF antenna is a maximum dimension along the surface of the RF antenna, and the RF antenna is spaced from the part of the ferrite core nearest to the RF antenna by less than 60% of the length of the maximum dimension.

3. The electrical device as claimed in claim 1, wherein the RF antenna comprises a planar antenna, and the RF antenna is spaced, in a direction perpendicular to a plane of the planar antenna, from the part of the ferrite core nearest to the RF antenna by less than the length of the geometric dimension of the RF antenna.

4. The electrical device as claimed in claim 3, wherein the planar antenna comprises a rectangular antenna and the length of the geometric dimension is the length of the diagonal of the rectangular antenna.

5. The electrical device as claimed in claim 1, wherein the RF antenna comprises a near field communications antenna with a maximum range of less than ten times the length of the geometric dimension of the RF antenna.

6. The electrical device as claimed in claim 5, wherein the RF antenna is part of a near field communications transponder tag or a near field communications reader/writer.

7. The electrical device as claimed in claim 1, wherein the ferrite core comprises a cuboid with a face facing the RF antenna, wherein the area of the face is larger than the area of the RF antenna.

8. The electrical device as claimed in claim 1 further comprising a housing, wherein the RF antenna is mounted within the housing, and wherein the housing comprises a metal body used as a heat sink.

9. The electrical device as claimed in claim 1 wherein the part of the ferrite core nearest to the RF antenna is bare without any winding coil of the transformer.

10. The electrical device as claimed in claim 1 further comprising a driver circuit, wherein the transformer is part of the driver circuit.

11. The electrical device as claimed in claim 10, wherein the driver circuit comprises a switch mode power supply, and the transformer is adapted to be used as an energy storage component of the switch mode power supply.

12. A LED light module comprising:
an LED light unit; and
the electrical device as claimed in claim 11, wherein the driver circuit comprises an LED driver configured to drive the LED light unit.

13. The LED light module as claimed in claim 12 further comprising a configuration circuit for configuring an output of the LED light unit in response to wireless commands received by the RF antenna.

14. The electrical device as claimed in claim 1 further comprising electronic components, wherein the ferrite core of the transformer is adapted to both:
conduct magnetic flux caused by electrical transforming carried out by the transformer; and
provide isolation of the RF antenna from the electronic components.

15. The electrical device as claimed in claim 1, wherein the RF antenna comprises a curved antenna.

16. The electrical device as claimed in claim 8, wherein the housing comprises a non-metal surface that covers the RF antenna.

17. The electrical device as claimed in claim 3 further comprising a printed circuit board, wherein the transformer is carried by the printed circuit board and the plane of the planar antenna is perpendicular to the printed circuit board.

18. The electrical device as claimed in claim 1 further comprising a printed circuit board, wherein the transformer is carried by the printed circuit board and a height of the ferrite core over the printed circuit board is at least half a height of the RF antenna over the printed circuit board.

19. The electrical device as claimed in claim 1, wherein a center of the RF antenna is not aligned with a center of the ferrite core.

20. A LED luminaire comprising the LED light module as claimed in claim 12.

* * * * *